UNITED STATES PATENT OFFICE.

JOHN M. MERRYMON, OF CHICAGO, ILLINOIS, ASSIGNOR OF ONE-HALF HIS RIGHT TO CHARLES H. SOUTHWICK, OF GRAND RAPIDS, MICH.

IMPROVEMENT IN PROCESSES OF MAKING A MIXED PAINT AND PAINT-OIL.

Specification forming part of Letters Patent No. 157,624, dated December 8, 1874; application filed November 28, 1874.

*To all whom it may concern:*

Be it known that I, JOHN M. MERRYMON, of Chicago, in the county of Cook, in the State of Illinois, have invented a new and Improved Mode of Producing a Mixed Paint and Paint-Oil; and I do declare that the following is a full and exact description of the preparation thereof.

The nature of my invention consists in first treating linseed-meal, or oil-cake, and linseed-oil with sulphuric acid, and then using this combination to treat paint-skins and garden beans in connection with petroleum, so that, while I dissolve the paint-skins into mixed paint, I produce a good drying paint-oil.

To enable others skilled in the art to make and use my invention, I will proceed to give a formulated description of the simple process I am now using to manufacture my paint and oil.

I incorporate, by stirring, ten (10) pounds of sulphuric acid with ten (10) pounds of linseed-meal or ground oil-cake, and ten (10) gallons of linseed-oil, and let it remain till the acid has fully acted; and then I add this to fifty (50) pounds of paint-skins, twenty (20) pounds of garden or field beans, and one hundred (100) gallons of kerosene-oil, contained in an iron kettle, to which I apply heat, and bring its contents to a gentle boil. I continue the boiling for three (3) or four (4) hours, with occasional stirring, to distribute the acid combination among the paint-skins, and prevent the material from baking. If the paint-skins are dry and hard before placing them in the kettle, I treat them with steam or hot water, to soften them into an even consistency, and to cleanse them from all potash, or other matter hurtful to the oil; and the moisture they retain after this treatment assists the chemical action during the boiling, and prevents any incrustation or scorching at the bottom of the kettle. When the process is completed I stir up the finely-dissolved paint with the oil and draw it off, through a fine sieve or strainer, into a vat to settle, and to the residuum left in the kettle undissolved I add fresh material, and proceed as before. The oil that I have drawn off, when settled, I fill into barrels, and the paint at the bottom I remove for use.

If I treat paint-skins and petroleum with sulphuric acid alone, the acid does not materially affect the oil, while the paint-skins become hard as stone; but if I treat them with a combination of linseed-oil and sulphuric acid, the petroleum gradually becomes a bodied and siccative oil, while the paint-skins dissolve into mixed paint. Again, if I incorporate, by stirring, sulphuric acid with linseed-meal or oil-cake and linseed-oil, the acid decomposes them, and combines with the mucilaginous and gummy matter of each, while it sets the oleine and margarine free. Now, if I add petroleum, and apply heat, it acquires body, and becomes siccative by combining with the free oleine and margarine, while the sulphuric acid remains undisturbed in its combination; but if I further add paint-skins or some metallic oxide, the sulphuric acid leaves its combination, and unites with the paint-skins or oxide. In doing this the acid performs a treble work: it combines the mucilaginous and gummy matter of the linseed-meal and oil with the petroleum, and, decomposing the paint-skins, it dissolves them into mixed paint, while it also combines the linseed-oil and gummy substance contained in the paint-skins with the petroleum.

My product now is a heavy-bodied and siccative paint-oil and mixed paint, but with a slight odor of petroleum. To get entirely rid of this I only needed to add garden or field beans with the paint-skins, as set forth in my formula, to impart to the petroleum the peculiar smell of old boiled linseed-oil.

If I deem it necessary to make my paint-oil alone, I add metallic oxide in place of paint-skins, and the sulphuric acid, uniting with the oxide, perfects my oil, as above described. If I desire to make mixed paint alone, I use only enough petroleum in the foregoing process to reduce the paint-skins as they dissolve to the consistency of mixed paint.

I wish to state that if I settle and decant my oil at the point before the paint-skins are added, it may be used for the manufacture of varnishes, driers, and various other purposes, as well as for painting; and my finished oil, made with the addition of paint-skins, answers all the purposes of boiled linseed-oil.

In the manufacture of my paint and oil, I do not confine myself to any given proportions or amount of product in my use of materials, but I vary them at pleasure to suit my purpose.

I claim as my invention—

1. In the manufacture of paint and paint-oil, the process of making a solvent for paint-skins by treating linseed-meal or oil-cake and linseed-oil with sulphuric acid, substantially in the manner described.

2. The process of manufacturing paint and paint-oil from paint-skins by adding the solvent made by treating linseed meal or cake and linseed-oil with sulphuric acid to paint-skins, in connection with petroleum and boiling, substantially as set forth.

3. In the manufacture of paint and paint-oil from paint-skins, the process of deodorizing the petroleum, in connection with the acid solvent described, and imparting the odor of old boiled linseed-oil to the whole by adding a quantity of beans in the boiling, substantially as specified.

4. The process of manufacturing paint-oil by adding the solvent made by treating linseed or oil cake and linseed-oil with sulphuric acid to an oxide, in connection with petroleum, and boiling, as set forth.

JOHN M. MERRYMON.

In presence of—
E. C. WEAVER,
E. M. FINCK.